United States Patent [19]
Mayne et al.

[11] Patent Number: 4,727,425
[45] Date of Patent: Feb. 23, 1988

[54] PIXEL COLOR MODIFICATION USING LOOK-UP TABLES IN IMAGE REPRODUCTION SYSTEM

[75] Inventors: Clive L. Mayne; Samuel E. Darby, both of Middlesex, England

[73] Assignee: Crosfield Electronics (USA) Limited, London, England

[21] Appl. No.: 870,557

[22] Filed: Jun. 4, 1986

[30] Foreign Application Priority Data

Jun. 10, 1985 [GB] United Kingdom ............... 8514608

[51] Int. Cl.⁴ ............................................. H04N 1/46
[52] U.S. Cl. ........................................ 358/80; 358/78; 358/75
[58] Field of Search ...................... 358/75, 78, 80, 28, 358/280; 364/526

[56] References Cited

U.S. PATENT DOCUMENTS

| | | | |
|---|---|---|---|
| 4,535,413 | 8/1985 | Shiota et al. | 358/80 |
| 4,622,582 | 11/1986 | Yamada | 358/80 |
| 4,631,578 | 12/1986 | Sasaki et al. | 358/80 |
| 4,668,980 | 5/1987 | Stansfield et al. | 358/80 |

FOREIGN PATENT DOCUMENTS 1294191 10/1972 United Kingdom .
2111342 6/1983 United Kingdom .

Primary Examiner—James J. Groody
Assistant Examiner—Robert M. Bauer
Attorney, Agent, or Firm—Sughrue, Mion, Zinn, Macpeak and Seas

[57] ABSTRACT

Digital signals are generated for each pixel of an image to be reproduced, corresponding to the values of color components in each pixel. The respective color component values of each pixel are applied to a set of look-up tables (30) so loaded that they recognize whether the color component values of a pixel fall within a color range(s) for which a processing operation is to be carried out. The look-up tables provide an output signal representing one of a number of possible processing operations for that pixel, in the form of an operation number. The operation number signal is applied through a processor (32) to an operation select table (36) which converts the operation number into a specific processing operation for each color component. The processing operations may be retouching, image retention (no change), replacement by a tint value, or dropout. They are carried out by components (44, 42, 38 and 40) under the control of the operation select table, and the resulting pixel values are transferred to an output buffer (24). The look-up tables may define the color ranges within which processing operations are required in terms of a range of a single color component or coinciding ranges of 2, 3 or 4 color components.

10 Claims, 2 Drawing Figures

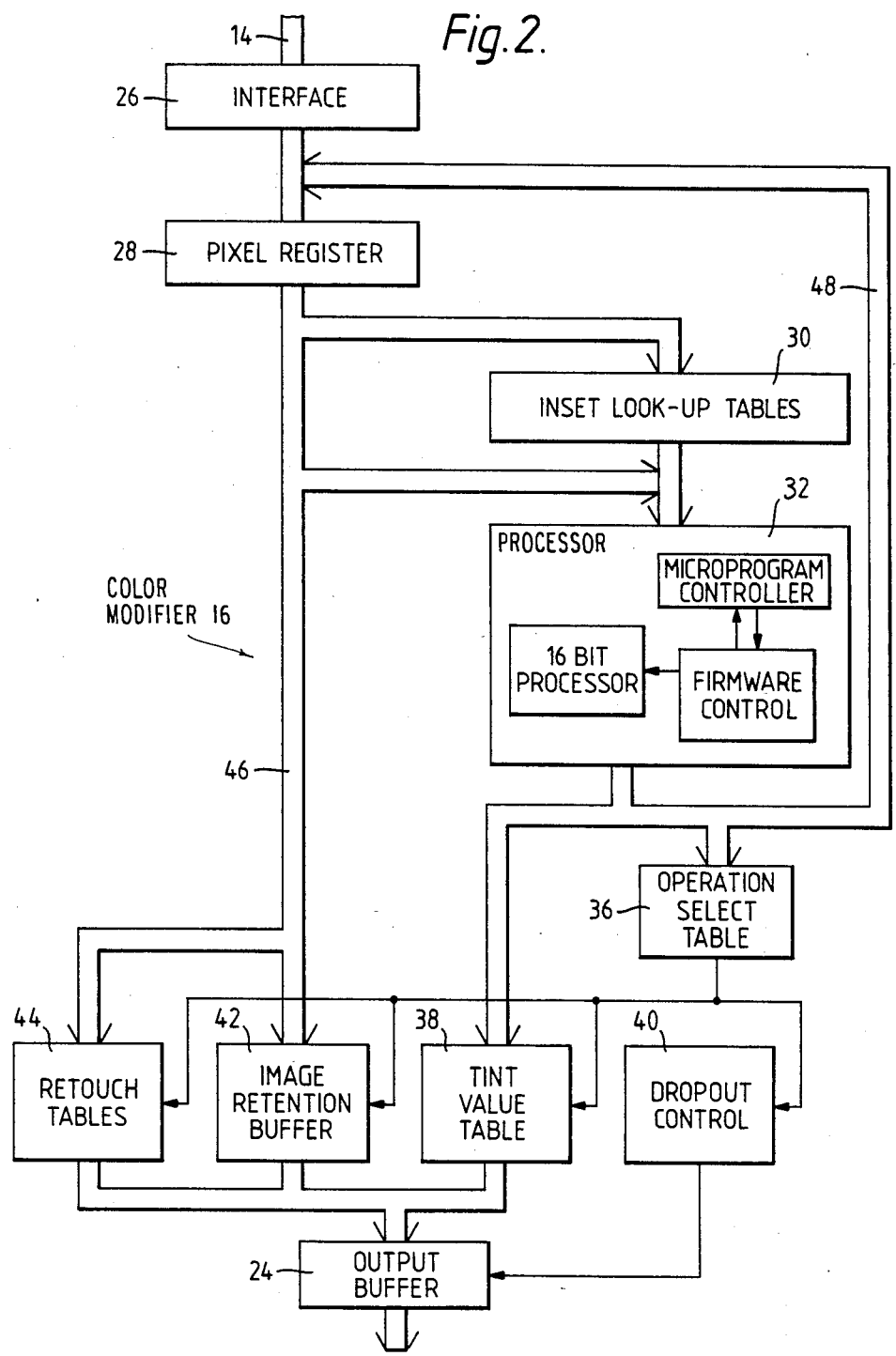

PIXEL COLOR MODIFICATION USING LOOK-UP TABLES IN IMAGE REPRODUCTION SYSTEM

BACKGROUND OF THE INVENTION

This invention relates to the reproduction of coloured images and in particular to colour modification carried out in the reproduction process.

It is known to carry out such modification electronically. Thus, a coloured original is scanned through a number of colour filters by a photoelectric device to produce electrical signals representing the colour components of the original. These signals are then modified as required before being used to modulate a light source exposing a photosensitive sheet to produce separation negatives constituting modified representations of the colour components of the original. These negatives are used in the preparation of the printing plates for cylinders for the different colour components, from which multi-colour prints are made.

The colour modification may be of the kind which provides colour correction for imperfections in the reproduction process, for example to compensate for the fact that the colour filters and the printing inks do not provide ideal complementary colour responses.

Alternatively, the colour modification may be of an editorial character, for example to enhance the appearance of flowers in the image or to enhance the flesh colour of a face portrayed in the coloured image.

An example of such a system is described in U.S. Pat. No. 2,799,722, which discloses a method of recognizing a particular "colour" in a picture by its trichromatic coordinates and of operating switches which, when a colour is thus recognized, substitute for the actual trichromatic scanner signals, signals with predetermined desired values. In such a system, the trichromatic signals define the "colour" in such a manner that its hue, saturation and brightness are all fixed.

In commonly assigned British Pat. No. 1294191 there is disclosed a method of colour identification which, instead of responding to a set of three coordinates, responds to two coordinates of "colour space". The same hue-plus-saturation combination was identified at all brightness levels.

The methods described in these two specifications will operate satisfactorily but have not been greatly used; this is probably due to their inflexibility.

SUMMARY OF THE INVENTION

The present invention has for its object to provide a method and apparatus for colour modification which is much more flexible in operation.

Apparatus according to the present invention includes means for providing digital signals corresponding to the values of colour components of an image to be reproduced; a set of look-up tables to which the respective colour component values of each pixel are applied and which, according to the colour component values, provide digital output signals indicating whether a processing operation is to be carried out for that pixel and defining one of a plurality of possible processing operations; and means capable of carrying out any one of the said plurality of possible processing operations and responsive to the output of the look-up tables for selecting and carrying out the defined one of the possible processing operations on the current pixel colour component values.

BRIEF DESCRIPTION OF THE DRAWINGS

In order that the invention may be better understood, an example of apparatus embodying the invention will now be described with reference to the accompanying drawings, in which:

FIG. 2 shows the colour modifier from the apparatus of FIG. 1.

DETAILED DESCRIPTION OF THE PREFERRED EMBODIMENT

Figure 1:
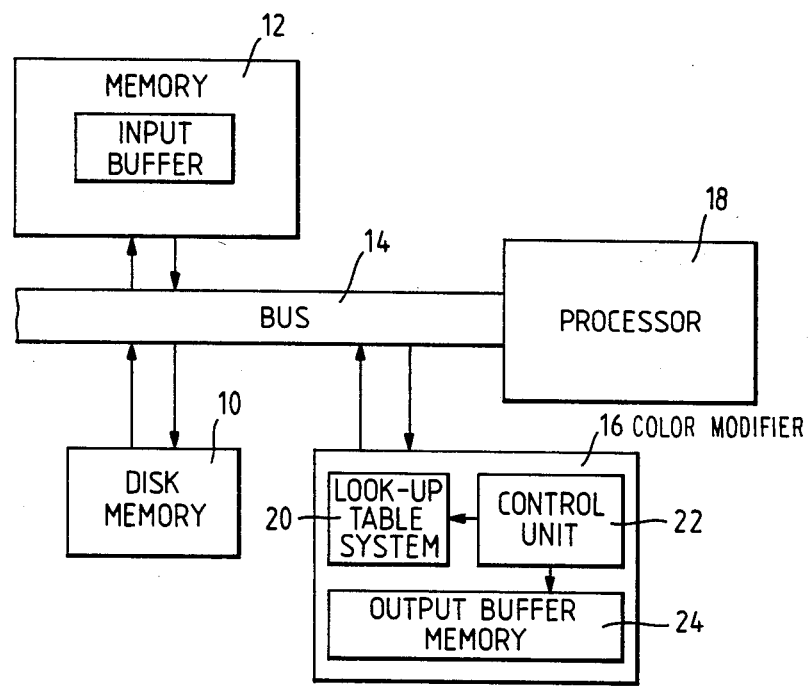
FIG. 1 illustrates the colour signal processing apparatus in broad outline.

In FIG. 1, image data can be transferred from a disc 10 to an input buffer in a memory 12, by way of a bus line 14. In this example this data transfer takes place line by line. From the input buffer 12, the image data is transferred through the bus 14 to a colour modifier 16, with layout information for the page derived from a processor 18. As will be described in greater detail with reference to FIG. 2, the colour modifier includes a look-up table system 20, a control unit 22 and an output buffer memory 24 to which the modified colour signals are applied.

Turning now to FIG. 2, the colour component signals are applied from the bus 14 through an interface 26 to a pixel register 28. The register 28 is a buffer which enables processing of pixels to be carried out in parallel with data transfers via the bus line.

Colour component values for the current pixel are applied to the inset look-up tables 30 which form a part of the look-up table system 20 in FIG. 1. For the purpose of this specification, the term "insetting" means a process of colour recognition of a pixel followed by an operation on the colour components of that pixel (e.g. colour modification, replacement or drop-out) or absence of operation on one or more pixel colour components (image retention). The tables 30 comprise four look-up tables (one for each of the colour components magenta, cyan, yellow and black), each table being of the one-dimensional kind with a capacity of 256×12 bits. These tables identify pixels on which operations are to be performed and define the operation to be performed on them.

In one example, eight of the twelve bits loaded into one memory location are used to define an inset operation number. In this way, one of a possible 256 operation definitions can be specified. For example, operation 25 may indicate that a retouching operation is to be carried out on all four channels and operation 26 may indicate that wherever cyan occurs it is replaced by a tint value. The remaining four bits are used to define the number of colour components involved in the definition of the colour for which the operation is carried out.

Thus, in a simple example an inset operation will be specified whenever the value of cyan is between 20 and 40 units, irrespective of the values of the other colour components. In this case, the final four bits would indicate that the inset was "keyed" in one colour only. In a more sophisticated system, an inset might be keyed in two colours (for example when cyan is between 20 and 40 units and magenta between 40 and 60 units), or may even be keyed in three or four colours.

The output of the inset look-up tables 30 is applied through a processor 32, to an operation select table 36 and a tint value table 38. The processor 32 includes a bit slice processor (16 bit), a microprogram controller, and a firmware control unit. It exercises a control function and can, for example, generate a "vignette". The vignette may, for example, be a flat tint graduated from blue at the top of the page to red at the bottom of the page.

In response to the operation number provided by the look-up tables 30, the operation select table 36 provides an output defining an operation to be carried out on one or more of the colour components and thereby controls a tint value table 38, a dropout control unit 40, an image retention buffer 42 and rotouch tables 44, which carry out these operations.

There are eight bits in the output of the operation select table 36. These comprise two bits for each of the four colour components, and each pair of bits specifies the operation required for the corresponding colour component.

Thus, for inputs to the tables which fall within specified ranges of the cyan and magenta (e.g. 20 to 40 cyan and 60 to 80 magenta), the output might be of the form 00 11 01 10

The first pair of bits (00) may specify that in the first colour component for consideration (for example black) there is to be "image retention", that is to say the colour component values for the pixel are applied directly from the pixel register 28 to the image retention buffer 42 and thence to the output buffer 24.

The next two bits may refer to the yellow component and the fact that they are (1 1) may indicate that a "colour shift" (retouching) operation is to be performed.

The next two bits (0 1) may apply to the magenta component and may call for a "drop-out" operation (block 40) and final two bits (1, 0) may apply to the cyan component and may indicate a tint inset operation.

The values to be used in the tint inset operation are determined by the operation number and the processor 32; these values are derived from a tint-value look-up table 38 containing tint values that are associated with that particular inset operation.

It will be seen from the above description that there are four ways of controlling the input of the output buffer.

The "tint inset" operation allows a pixel to be replaced by a tint value that has been loaded in the tint value table 38.

In the "image retention" mode, the contents of pixel register 28 are applied unchanged by way of bus 46 and image retention buffer 42 to the output buffer 24.

The "dropout" operation is effectively placing a window in the memory for one or more colour components, allowing the underlying image data (if any) to be seen. This is achieved by inhibiting writing operations in the memory where dropout is required.

For "colour shift" operations, a retouch look-up table in block 44 is addressed by the source image data over bus 46. The retouch look-up table is loaded with retouch information as defined by the operator. In the apparatus which is being described, there are effectively sixteen look-up tables in parallel in block 44, each loaded with retouch information, and any one of these tables can be selectively switched into the data path when it is required. The retouch tables are content-addressable.

In the inset operation, colours defined by a single "key" colour component or by more than one "key" colour component, can cause different ones of the colour components to be differently treated; for example, image retention for one colour component, replacement by a tint value for another colour component and dropout for third and fourth colour components.

As an example, an operation keyed by a single colour might be as follows. For values of cyan between 20 and 40 percent, the cyan channel is subjected to "dropout", the magenta channel to image retention, the yellow channel to replacement by a 35% yellow value, and the black channel to replacement by a 10% black value.

This introduces a specific tint into the pixels to which this operation is applied.

As explained above, a set of operations may be introduced in response to a multi-colour key. Examples of multi-colour keys are as follows:

|  | C | M | Y | K |
|---|---|---|---|---|
| M 20-50, C 60-80 | DR | IR | TF | TF |
| M 0-20 C 30-40, Y 40-100, B 0-50 | DR | DR | DR | DR |
| M 0-20 C 30-40, Y 40-100, B 0-50 | CS | CS | CS | CS |

(where DR—Dropout, IR—Image Retention, TF—Tint Inset, CS—colour shift).

In this way, an area of coloured space can be identified and then operated on. Differentiation between closely related colours is possible.

An example of colour-defined inset operation is the insetting of a girl's hair over a background. The hair is too fine to allow a definition of its shape by a mask but a range of colour can be defined to allow the hair colour to be retained and the background colour suppressed in any pixel in which the hair colour is present. A line of background data is first written into the output buffer 24 and the pixels of the same line for the foreground (including the hair) are put into the register 28 and subjected to image retention where the hair colour is recognised (in which case they replace the corresponding pixel values in the output buffer 24) or to drop-out, where the hair colour is not present.

The loop provided by bus 48 allows successive operations to be performed on a single pixel. For example, the processor 32 may be programmed to effect a colour-component "swap", for example to transfer cyan values into the magenta channel, and the new magenta values can be transferred over bus 48 back to the pixel register to allow them to be retouched by the tables in block 44. Bus 48 is also used in vignetting; processor 32 generates the value required by the vignette and this value is then returned to pixel register 28.

For simplicity it is desirable to use one-dimensional look-up tables and as a consequence some problems arise if intersecting regions of colour space within the same image are defined. This can be overcome by including a priority or deferral system. For example, if two regions of colour space to be operated on differently are defined as follows:

| Region 1 - C 21-40, M 40-60 |
|---|
| Region 2 - C 60-80, M 40-70 | then as the magenta ranges in the two regions overlap it is necessary to specify that for a magenta value in the region 40 to 60, magenta defers to cyan in the determination of the operation to be performed.

It will be seen that the apparatus described enables colour modification which is very flexible, in that different retouching tables can be brought into operation and different tint values can be defined, and which at the same time is very comprehensive in that a large number of regions of colour space can be separately identified and separately processed in different ways.

The apparatus also provides the capability of selecting whether a pixel is to be operated on, based on the average colour components of a selectable number of adjacent pixels. This operation is carried out by the processor 32 which will take an average of 2, 4, 8 or 16 pixels and apply the resultant average pixel value to the pixel register 28. This average pixel value is then acted upon as previously described.

We claim:

1. Apparatus for modifying colours in image reproduction systems, including:
   means for providing digital signals corresponding to the values of colour components of an image to be reproduced;
   a set of look-up tables to which the respective colour component signal values of each pixel are applied and which, according to the colour component signal values, provide digital output signals indicating whether a processing operation is to be carried out for that pixel, said digital output signals defining one of a plurality of possible processing operations;
   and control means capable of carrying out any one of the said plurality of possible processing operations, said control means being responsive to the output signals from the look-up tables for selecting and carrying out the defined processing operation on the current pixel colour component signals.

2. Apparatus in accordance with claim 1, in which the said set of look-up tables selects the processing operation to be performed on a pixel in accordance with a combination of the values of at least two colour component signals.

3. Apparatus in accordance with claim 2, including priority selection means operation when a given range of one colour component occurs in each of two colour component definitions for which different processing operations are required, to give priority to another colour component, for which such overlap does not occur, for the selection of the processing operation to be carried out.

4. Apparatus in accordance with claim 1, in which at least one of the possible processing operations involves treating the values of different colour components of an image pixel in different ways.

5. Apparatus in accordance with claim 1, in which the control means includes an operation-select table which converts the digital output of the said set of look-up tables into a digital operation-defining signal for each colour component of a pixel for which a processing operation is to be carried out.

6. Apparatus in accordance with claim 5, in which the control means includes means operable, under the control of the operation-select table, to carry out at least one of the following processing operations on a colour-component signal, namely retouching, replacement by a tint value, and drop-out.

7. Apparatus in accordance with claim 5, in which at least one processing operation involves the replacement of at least one colour component value of a pixel by a tint value and in which the control means includes a tint-value look-up table responsive to the output of the said set of look-up tables to define the tint value.

8. Apparatus in accordance with claim 5, in which at the control means includes a drop-out circuit responsive to the operation select table to block the passage of at least one colour component signal to achieve a dropout in that colour component.

9. Apparatus in accordance with claim 5, in which in the control means includes a retouching look-up table responsive to the output of the operation-select table to modify at least one colour component value.

10. Apparatus in accordance with claim 1, in which the means for providing digital signals comprises means for determining the average colour component value of a number of adjacent pixels, said average values being applied to said set of look-up tables.

* * * * *